June 7, 1927.
J. HARRIS
VALVE FOR TANKS
Filed June 19, 1924
1,631,372
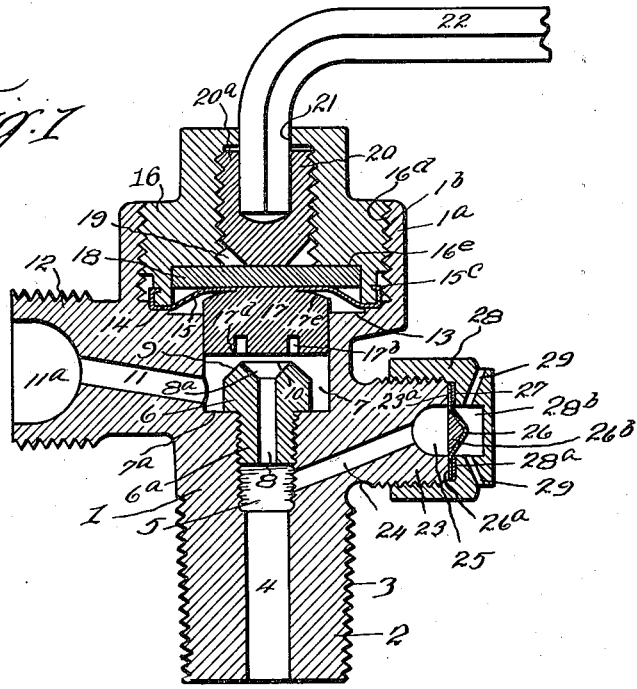
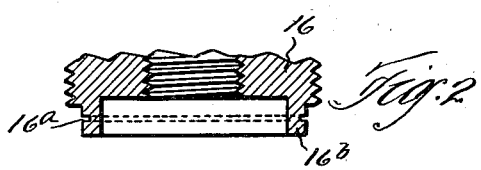
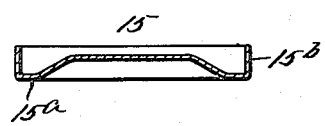
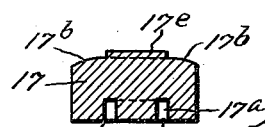
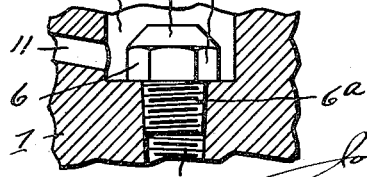
Inventor
John Harris,
By Hull, Buck & West,
Attys.

Patented June 7, 1927.

1,631,372

UNITED STATES PATENT OFFICE.

JOHN HARRIS, OF CLEVELAND, OHIO, ASSIGNOR TO THE HARRIS CALORIFIC COMPANY, OF CLEVELAND, OHIO, A CORPORATION OF OHIO.

VALVE FOR TANKS.

Application filed June 19, 1924. Serial No. 720,943.

This invention relates to valves for tanks containing gases under pressure, and particularly to valves of the type wherein a diaphragm operates to control, or to assist in controlling, the flow of gas from a tank to the point of use. It is the general purpose and object of the invention to provide a valve of this character which will not leak, notwithstanding its use for handling gases under the pressures which obtain in such tanks; to provide a valve of this character wherein the diaphragm will not burst nor rupture by reason of the pressure of the gases to which it is subjected; also to provide a valve of this character which can be firmly seated without injury to the diaphragm, and one which is not liable to injury by reason of the unauthorized or unintelligent operation of the same.

A further object of the invention is to provide a valve of this character with a particularly efficient safety "blow-off" of the type which is capable of operating, not only through the fusion of the backing for the disk when exposed to abnormally high temperatures while operating under ordinary tank pressures, but also through the development of undue pressure within the tank, even should the backing not be subjected to a temperature sufficient to produce such fusion.

A further object of the invention is to provide a valve of this character which is not only more efficient in operation and in service than valves heretofore used for its purpose, but one which can be produced at a minimum of expense.

I accomplish the foregoing objects and other objects which will appear hereinafter in and through the combinations and arrangements of parts described in the specification and embodied in the claims, the invention being illustrated in the drawings forming part hereof, wherein Fig. 1 represents a central vertical sectional view through the valve, certain parts being shown in elevation; Figs. 2, 3 and 4 are sectional views through the cooperating parts of the locking plug, diaphragm and valve, prior to the assembling of the same; and Fig. 5 a sectional detail showing the valve seat in elevation within the cooperating parts of the valve body.

Describing the various parts by reference characters, 1 represents generally the body of the valve, the same being of any suitable metal and having a slightly tapered lower end 2 provided with a thread 3 by which the valve body may be secured in the top of the tank with which it cooperates, the tank being of any standard construction such as is used for containing and shipping gases under pressure—for instance, oxygen and cutting and welding gases.

The valve body is provided with a central bore 4. The upper end of the bore is slightly enlarged and threaded, as indicated at 5, for the reception of the threaded stem $6^a$ of the valve seat plug 6. The upper end of the valve seat plug 6 is located within a chamber 7 and is provided with a hexagonal body $6^b$ which is adapted to receive a socket wrench and the lower face of which seats upon the bottom wall $7^a$ of the chamber 7. The plug is provided with a central bore 8 communicating at its lower end with the bore 4, 5 and constituting with such bore a passage for the supply of gas to the chamber 7. The upper end of the bore 8 merges with an inverted frusto-conical cup $8^a$, formed in the top of the valve seat plug. The upper outer part of the plug is tapered or frusto-conical in shape, as indicated at 9, the tapered seating surfaces $8^a$ and 9 meeting in a common circular line or edge 10. It will be evident that the upper end of the valve seat plug 6 is triangular in vertical section.

An upwardly inclined passage 11 leads from one side of the chamber 7 and discharges into a chamber $11^a$ in the threaded portion of a connection 12, the said connection being adapted to receive a suitable regulator for delivering the gas passing through the valve to the point of use—for instance, the valve block of a blow-pipe.

It will be noted that the chamber 7 is sufficiently larger in cross-sectional area than the valve-seat plug to receive the lower end of a socket wrench, thereby enabling the plug to be conveniently applied to and removed from the assembly.

The upper end of the chamber 7 communicates with an extension chamber 13 the lower end of which is surrounded by a horizontal annular ledge or shoulder 14. 15 denotes the diaphragm, the said diaphragm having a peripheral portion $15^a$ which is adapted to rest upon the ledge or shoulder 14. Projecting upwardly from the peripheral portion 15$^a$ is a flange 15$^b$ the upper edge of which is bent inwardly, as shown at 15$^c$ (Fig. 1), to fit within a seat 16$^a$ formed within the outer surface of the lower cylindrical end 16$^b$ of a diaphragm-locking plug, 16, the said plug having an external thread 16$^d$ whereby it is fitted within the upper end 1$^a$ of the body 1, such end being provided with an internal thread 1$^b$ for the reception of said locking plug. 17 denotes the valve block, the said block being generally cylindrical in shape and guided by the upper portion of the chamber 7, there being sufficient clearance between the valve block and the chamber to permit gas to actuate the diaphragm. This valve block is provided with an annular groove 17$^b$ in the bottom thereof providing a circular inner seating portion 17$^c$ and an outer circular seating portion 17$^d$ adapted respectively to engage the reversely inclined seating surfaces 8$^a$ and 9 of the valve seat plug therebeneath. This construction positively prevents any leakage between the valve seat plug and the cooperating valve block 16. Prior to assembling the parts, the valve block is provided with a central circular elevated portion 17$^e$; and the central portion of the diaphragm 15 is connected to such portion, 17$^e$, as by electrically welding the same together, with the result that the part 17$^e$ and the central portion of the diaphragm fuse and merge into an integral connection, as is clearly apparent from Fig. 1. The upper surface of the valve block 17 which surrounds the central portion 17$^e$ is convex, as indicated at 17$^f$. In practice, the projection 17$^e$ is about one-quarter inch in diameter and the convex surface 17$^f$, surrounding the zone of fusion between the diaphragm and the valve block, enables the diaphragm to flex against the backing disk 18, which is interposed between the top of the diaphragm and a seat 16$^e$ provided within the cylindrical end 16$^b$ of the locking plug. The chamber formed within the part 16$^b$ and within the shoulder 14 constitutes a diaphragm chamber, as indicated at 13.

When not in use, and particularly during shipment of the tanks with which they are used, the valve blocks 17 should be seated in such manner as to prevent their being tampered with. To secure this result, the locking plug 16 is provided with a central bore 19, the bore extending upwardly from the horizontal seat 16$^e$ and being internally threaded for the reception of an externally threaded valve-locking plug 20. This plug is applied to the bore 19 from the lower end thereof, the bore terminating short of the upper end of the plug 16, there being a reduced bore 21 through the upper end of the latter plug for the reception of the lower end of a small angular socket wrench 22 which is adapted to enter a corresponding socket 20$^a$ in the top of the plug 20. By the use of this wrench, the plug 20 may be screwed down, thereby to force the backing disk 18 and the valve block 17 downwardly until the valve is seated upon the upper end of the seat 6; also, by operating the wrench in the reverse direction, the plug 20 will be unscrewed to permit the disk 18 to seat against shoulder 16$^e$.

By the construction thus far described, I have provided a tank valve in which the possibility of leakage between the valve 17 and the seat 6 is rendered practically impossible, by virtue of the double seat provided by the parts 8$^a$ and 9 and 17$^c$, 17$^d$. By connecting the valve block 17 with the diaphragm 15 in the manner described, the diaphragm is not perforated at its central portion, but is actually reinforced at such point by its connection with the plug 17. This positively prevents any leakage through the central portion of the diaphragm. Furthermore, the manner of connecting the diaphragm and valve block 17 enables the diaphragm to flex freely beyond the zone of connection between the same and the block. By connecting the diaphragm with the plug 16, the valve block 17, the diaphragm, and the backing disk 18 may be removed bodily from the valve body 1, by merely unscrewing the said plug.

One of the tank valves which is in extensive use employs the diaphragm itself for the valve, forcing the same into engagement with the valve seat. This is objectionable in that the diaphragm, after a short time, fails to make a gastight closure with the seat, with the result that leakage occurs, such leakage constituting, in the types of tank valves in general use, a very considerable proportion of the contents of the tank.

The valve body 1 is provided with a blow-off connection 23 having the outlet port 24 communicating with the bore 5. The port 24 communicates with a small chamber 25 in the outer end of the connection 23, which chamber constitutes the delivery end of the port and is surrounded by an annular seat 23$^a$. The safety disk which is employed with this connection is provided with a central outwardly projecting conical portion 26, such conical portion being of slightly smaller diameter than the chamber 25 and being surrounded by the annular seating portion 26$^a$ which is adapted to rest upon the seat 23$^a$ and to be clamped against said seat by means of a gasket 27 resting within an annular seat 28$^a$ carried by the screw cap 28, the said cap being provided with a chamber 28$^b$ into which the conical portion 26 of the disk may project, with a narrow annular section of the disk surrounding such conical portion in said chamber. The chamber is provided with blow-off ports 29 extending outwardly therefrom.

The disk 26, 26ᵃ is of such material as will enable the same to be fractured by a predetermined pressure of gas, irrespective of temperature conditions. In safety disks of this general type, the central or body portions of the disks being subjected to the high pressure of the gases in the tanks are stretched and become distorted and finally rupture under such tank pressures. In order to prevent such stretching, distortion and premature rupture, the concave side of the central portion of the disk is backed with metal, filling such concavity, as indicated at 26ᵇ. The metal employed may be solder, or brass or other metal swaged into the concavity. When so constructed, there can be no stretching or distortion of the central portion of the disk, but the disk will be fractured under the predetermined maximum pressure for which it is designed, in the narrow ring immediately surrounding the centrally projecting portion. The manner of constructing the disk provides in effect an integral reinforced central portion.

This application is, in some respects, a continuation of my application No. 681,499 filed December 19, 1923 and of my application No. 647,245 filed June 23, 1923.

Having thus described my invention, what I claim is:

1. In a valve of the character described, the combination of a body having a passage for the supply of fluid, there being a valve seat at the delivery end of said passage, with a diaphragm chamber beyond the said seat and a delivery port communicating with the said chamber, a diaphragm extending across the diaphragm chamber, a valve secured to the central portion of the said diaphragm and adapted to engage the said valve seat, a backing on the opposite surface of the diaphragm from the said valve, a plug for securing the diaphragm to its seat, and a socketed plug threaded within the first mentioned plug, the said socketed plug having a portion adapted to be projected through the bottom of the first mentioned plug to engage said backing and the first mentioned plug being provided with a portion at its upper or outer end adapted to overhang the said plug to prevent its withdrawal in one direction from the first mentioned plug.

2. In a valve of the character described, the combination of a body having a passage for the supply of fluid, there being a valve seat at the delivery end of said passage, with a diaphragm chamber beyond the said seat and a delivery port communicating with the said chamber, a diaphragm secured at its peripheral portion and extending across the diaphragm chamber, a valve having its central portion integrally connected with the central portion of the diaphragm and adapted to engage the said valve seat, a backing on the opposite surface of the diaphragm from the said valve, and a stop adapted to be engaged by the said backing.

3. In a valve of the character described, the combination of a body having a passage for the supply of fluid, there being a valve seat at the delivery end of said passage, with a diaphragm chamber beyond the said seat and a delivery port communicating with the said chamber, a diaphragm secured at its peripheral portion and extending across the diaphragm chamber, a valve having its central portion connected by fusion with the central portion of the diaphragm and adapted to engage the said valve seat, a backing on the opposite surface of the diaphragm from the said valve, and a stop adapted to be engaged by the said backing.

4. In a valve of the character described, the combination of a body having a passage for the supply of fluid, there being a valve seat at the delivery end of said passage, with a diaphragm chamber beyond the said seat and a delivery port communicating with the said chamber, a diaphragm secured at its peripheral portion and extending across the diaphragm chamber, a valve having its central portion welded to the central portion of the diaphragm and adapted to engage the said valve seat, a backing on the opposite surface of the diaphragm from the said valve, and a stop adapted to be engaged by said backing to limit the movement of the diaphragm.

5. In a valve of the character described, the combination of a body having a passage for the supply of fluid, there being a valve seat at the delivery end of said passage, with a diaphragm chamber beyond the said seat and a delivery port communicating with the said chamber, a diaphragm secured at its peripheral portion and extending across the diaphragm chamber, a valve having its central portion united by fusion with the central portion of diaphragm and adapted to engage the said valve seat, the portion of the valve surrounding such zone of fusion receding from the diaphragm, and a backing on the opposite surface of the diaphragm from the said valve.

6. In a valve of the character described, the combination of a body having a passage for the supply of fluid and provided with a valve seat at the delivery end of said passage, with a diaphragm chamber beyond the said seat, a valve connected to the diaphragm and cooperating with said seat, and a delivery port communicating with the said chamber, of a blow-off connection having a port communicating with said passage and provided with an annular seat surrounding the delivery end of said port, a disk having a peripheral portion adapted to be clamped upon said seat and having an intermediate reinforced portion, and a cap having one or more blow-off outlets for securing the peripheral portion of the disk to the said seat.

7. In a valve of the character described, the combination of a body having a passage for the supply of fluid and provided with a valve seat at the delivery end of said passage, with a diaphragm chamber beyond the said seat, a valve connected to the diaphragm and cooperating with said seat, and a delivery port communicating with the said chamber, of a blow-off connection having a port communicating with said passage and provided with a seat surrounding the delivery end of said port, a disk having a peripheral portion adapted to be clamped upon said seat and having an intermediate outwardly projecting portion with a metal backing filling the cavity on the opposite side of such projecting portion, and means for securing the peripheral portion of the disk to the said seat.

8. In a valve of the character described, the combination of a body having a passage for the supply of fluid and provided with a valve seat at the delivery end of said passage, with a diaphragm chamber beyond the said seat, a valve connected to the diaphragm and cooperating with said seat, and a delivery port communicating with the said chamber, of a blow-off connection having a port communicating with said passage and provided with a chamber at the delivery end of said port and with a seat surrounding the chamber, a disk having a peripheral portion adapted to be secured to said seat and a central outwardly projecting reinforcing portion of less diameter than said chamber, and a cap for securing the said disk upon its seat, the said cap having a chamber of greater diameter than the conical projection and provided with one or more blow-off ports extending therefrom.

9. In a valve of the character described, the combination of a body having a passage for the supply of fluid and provided with a valve seat at the delivery end of said passage, with a diaphragm chamber beyond the said seat, a valve connected to the diaphragm and cooperating with said seat, and a delivery port communicating with the said chamber, of a blow-off connection having a port communicating with said passage and with a seat at the delivery end of said port, a disk having a peripheral portion adapted to be secured to said seat and a central portion having metal applied thereto, such central portion being of less diameter than the delivery end of said port, and means for securing said disk upon its seat, the securing means having an internal diameter greater than such central portion of said disk.

10. In a valve of the character described, the combination of a body having a passage for the supply of fluid and provided with a valve seat at the delivery end of said passage, with a diaphragm chamber beyond the said seat, a valve connected to the diaphragm and cooperating with said seat, and a delivery port communicating with the said chamber, of a blow-off connection having a port communicating with said passage and with a seat surrounding the delivery end of said port, a disk having a peripheral portion adapted to be secured to said seat and a central outwardly projecting conical portion with metal substantially filling the cavity on the opposite side from such portion, such reinforced central portion being of less diameter than the said seat, and a cap on the outer end of such connection and having an annular seating portion opposed to the seat which surrounds the said chamber, the said cap having a chamber of greater diameter than the diameter of the reinforced central projecting portion of the disk and being provided with one or more blow-off ports extending from said chamber.

11. In a valve of the character described, the combination of a body having a passage extending upwardly from the bottom thereof for the supply of fluid and a valve seat having a port forming a continuation of the said passage, there being a chamber beyond the valve seat, with a delivery port communicating with said chamber, a diaphragm chamber having an annular seat, a diaphragm having a portion adapted to engage said seat, a plug removably mounted in said body and having a portion adapted to clamp the diaphragm to its seat, and a valve secured to said diaphragm, the said diaphragm being secured to said plug whereby the diaphragm and valve may be removed with the plug.

12. In a valve of the character described, the combination of a body having a passage extending upwardly from the bottom thereof for the supply of fluid and a valve seat having a port forming a continuation of the said passage, there being a chamber beyond the valve, with a delivery port communicating with said chamber, a diaphragm chamber having an annular seat, a diaphragm having a portion adapted to engage said seat, a plug removably mounted in said body and having a portion adapted to clamp the diaphragm to its seat and provided with a seating groove in the external surface of such clamping portion into which the edge of the diaphragm is fitted, and a valve secured to said diaphragm.

13. In a valve of the character described, the combination of a body having a passage extending upwardly from the bottom thereof for the supply of fluid and a valve seat having a port forming a continuation of the said passage, there being a chamber beyond the valve, with a delivery port communicating with said chamber, a diaphragm chamber having an annular seat, a diaphragm having a portion adapted to engage said seat, a plug removably mounted in said body and having a portion adapted to clamp the diaphragm to its seat and provided with a seating groove in the external surface of such clamping portion into which the edge of the diaphragm is fitted, said plug having a seat within such clamping portion, a backing disk for the diaphragm and interposed between the latter and such seat, and a valve secured to said diaphragm.

14. In a valve of the character described, the combination of a body having a passage for the supply of fluid, there being a valve seat at the delivery end of said passage, with a diaphragm chamber beyond the said seat and a delivery port communicating with the said chamber, a diaphragm extending across the diaphragm chamber, a valve on the chamber-side of the diaphragm and adapted to engage the said valve seat, a plug for securing the diaphragm to its seat, and a plug threaded within the first mentioned plug, the second plug having a portion adapted to be projected through the bottom of the first mentioned plug to press the diaphragm and the valve on the opposite side thereof toward said seat and the first mentioned plug being provided with a portion at its upper or outer end adapted to engage the said plug to prevent its withdrawal in one direction from the first mentioned plug, the second plug being provided at its upper end with means for engagement by a tool inserted through the upper end of the first mentioned plug.

In testimony whereof, I hereuto affix my signature.

JOHN HARRIS.